US011679650B2

(12) United States Patent
Kimura et al.

(10) Patent No.: US 11,679,650 B2
(45) Date of Patent: Jun. 20, 2023

(54) DOOR SASH STRUCTURE

(71) Applicant: AISIN CORPORATION, Aichi (JP)

(72) Inventors: Jun Kimura, Kanagawa (JP); Takashi Kameyama, Kanagawa (JP)

(73) Assignee: AISIN CORPORATION, Aichi (JP)

( * ) Notice: Subject to any disclaimer, the term of this patent is extended or adjusted under 35 U.S.C. 154(b) by 5 days.

(21) Appl. No.: 16/646,818

(22) PCT Filed: Oct. 24, 2018

(86) PCT No.: PCT/JP2018/039562
§ 371 (c)(1),
(2) Date: Mar. 12, 2020

(87) PCT Pub. No.: WO2019/087906
PCT Pub. Date: May 9, 2019

(65) Prior Publication Data
US 2020/0276890 A1 Sep. 3, 2020

(30) Foreign Application Priority Data

Nov. 1, 2017 (JP) .............................. JP2017-212125

(51) Int. Cl.
*B60J 5/04* (2006.01)
*B60J 10/76* (2016.01)
*B60J 1/17* (2006.01)

(52) U.S. Cl.
CPC ............ *B60J 5/0402* (2013.01); *B60J 5/0404* (2013.01); *B60J 1/17* (2013.01); *B60J 10/76* (2016.02)

(58) Field of Classification Search
CPC ....... B60J 5/0402; B60J 5/0436; B60J 5/0404
See application file for complete search history.

(56) References Cited

U.S. PATENT DOCUMENTS 5,964,063 A * 10/1999 Hisano ................. B60J 1/17
49/352
9,346,339 B2 * 5/2016 Shimizu ............... B60J 5/0402
(Continued)

FOREIGN PATENT DOCUMENTS

| JP | 2005271633 A | 10/2005 |
|----|--------------|---------|
| JP | 4355905 B2   | 11/2009 |

(Continued)

OTHER PUBLICATIONS

International Search Report (PCT/ISA/210) dated Dec. 11, 2018, by the Japanese Patent Office as the International Searching Authority for International Application No. PCT/JP2018/039562.

(Continued)

*Primary Examiner* — Gregory J Strimbu
(74) *Attorney, Agent, or Firm* — Buchanan Ingersoll & Rooney PC

(57) ABSTRACT

A door sash structure according to an embodiment includes a sash, a mirror attachment member, and an outer reinforcement attachment member. The sash is configured to guide a front end edge of a door glass of a vehicle while the door glass moves upward or downward. The mirror attachment member is configured to allow a door mirror to be attached thereto, and is fixed to the sash. The outer reinforcement attachment member is configured to allow at least one of a door outer panel and an outer reinforcement extending along the door glass on a side of the door glass adjacent to an outside of the vehicle to be attached thereto, and is fixed to an outer surface of the mirror attachment member that faces the outside of the vehicle, and separated from the sash.

8 Claims, 7 Drawing Sheets

(56) References Cited

U.S. PATENT DOCUMENTS

| | | | |
|---|---|---|---|
| 10,076,950 B2 * | 9/2018 | Usui | B60J 5/0404 |
| 2013/0061529 A1 | 3/2013 | Grudzinski et al. | |
| 2014/0132029 A1 * | 5/2014 | Kuroki | B60J 5/0451 |
| | | | 296/1.11 |
| 2015/0108785 A1 * | 4/2015 | Yokota | B23K 31/02 |
| | | | 296/146.5 |
| 2015/0135600 A1 * | 5/2015 | Yokota | B60J 5/0412 |
| | | | 49/502 |
| 2019/0299757 A1 * | 10/2019 | Tomeki | B60J 5/0422 |
| 2020/0101822 A1 * | 4/2020 | Kandra | B60J 5/0454 |

FOREIGN PATENT DOCUMENTS

| | | | |
|---|---|---|---|
| JP | 2013184549 A | | 9/2013 |
| JP | 2015-54660 | * | 3/2015 |
| JP | 2017149288 A | | 8/2017 |
| KR | 10-2004-0014681 A | | 2/2004 |
| KR | 10-2012-0077091 A | | 7/2012 |

OTHER PUBLICATIONS

Written Opinion (PCT/ISA/237) dated Dec. 11, 2018, by the Japanese Patent Office as the International Searching Authority for International Application No. PCT/JP2018/039562.

Japanese Decision to Grant a Patent for Japanese Application No. 2017-212125 dated Sep. 3, 2019 (4 pages).

The extended European Search Report dated Jul. 1, 2021, by the European Patent Office in corresponding European Patent Application No. 18873827.2-1015. (8 pages).

* cited by examiner

FIG.1
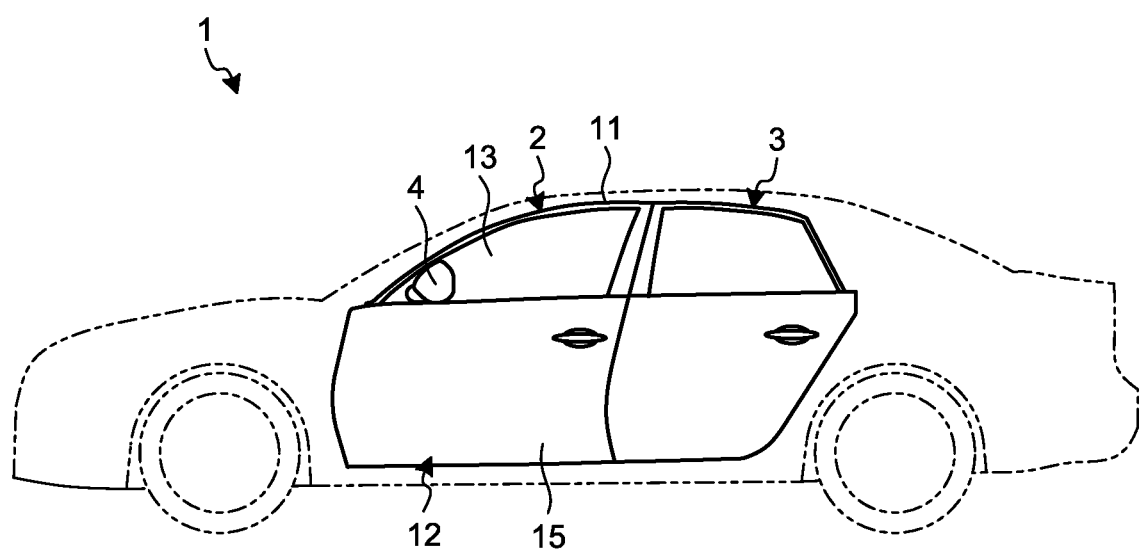
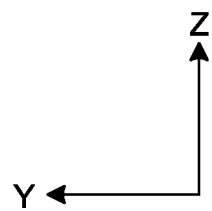

FIG.7
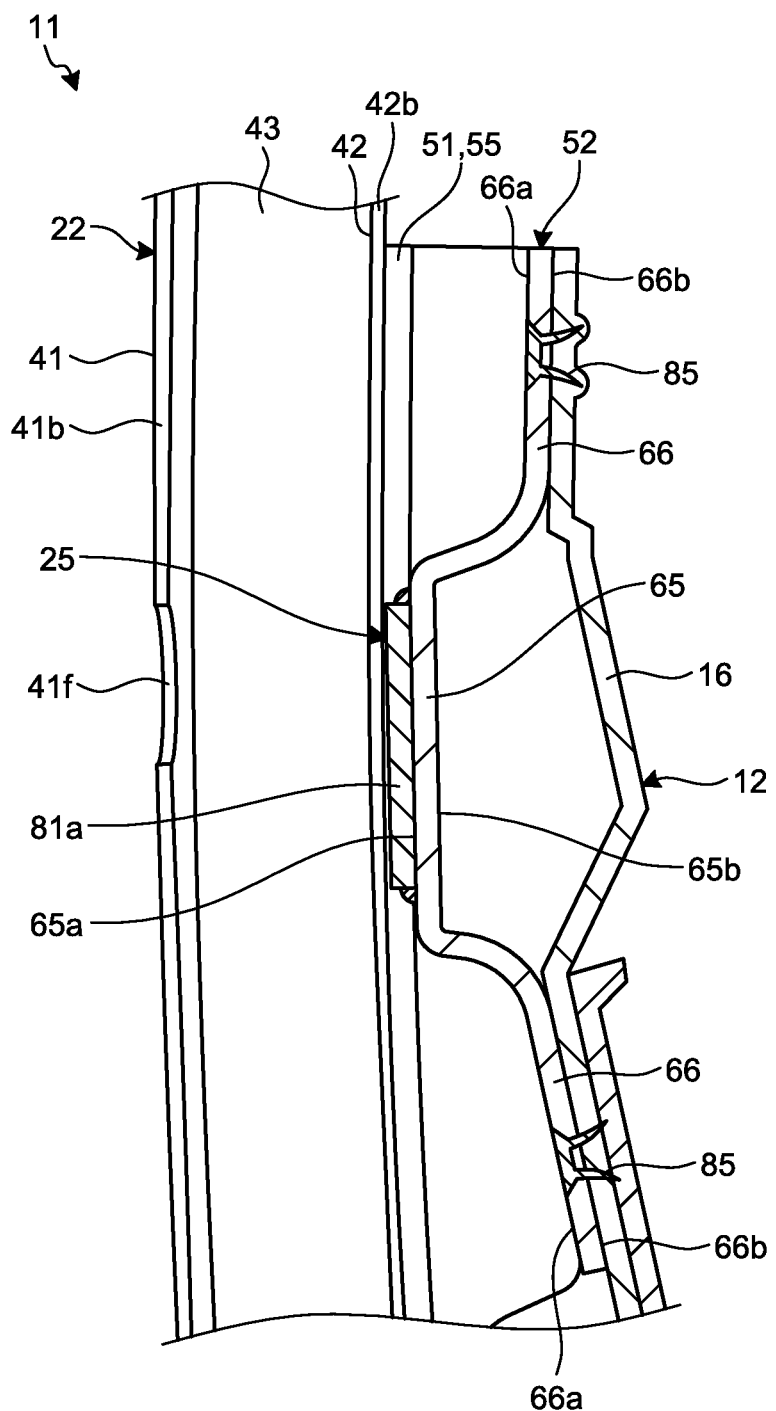
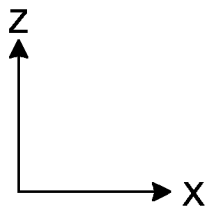

FIG.8
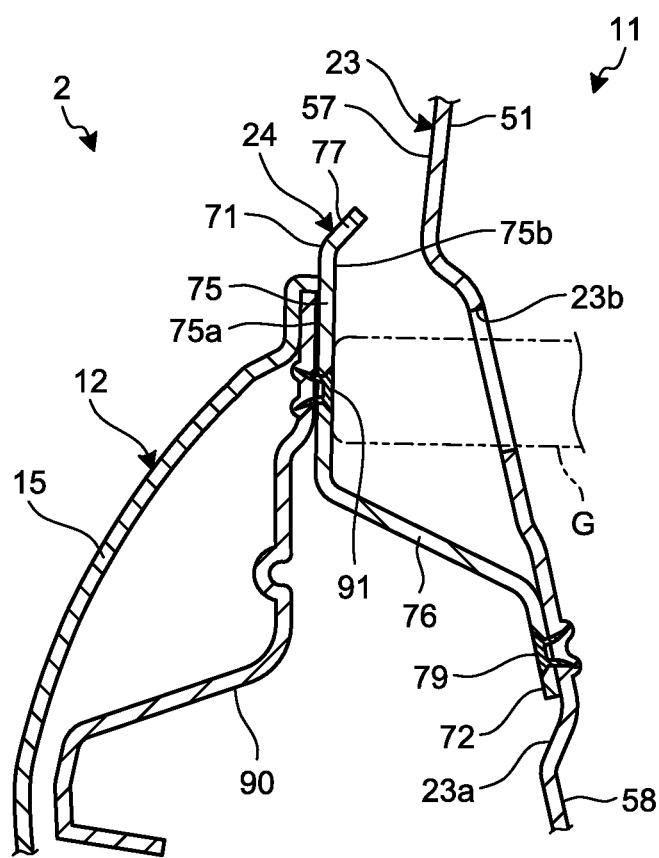
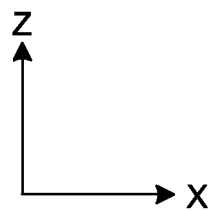

US 11,679,650 B2

DOOR SASH STRUCTURE

CROSS-REFERENCE TO RELATED APPLICATIONS

This application is a national stage application of International Application No. PCT/JP2018/039562, filed Oct. 24, 2018, which designates the United States, incorporated herein by reference, and which claims the benefit of priority from Japanese Patent Application No. 2017-212125, filed Nov. 1, 2017, the entire contents of which are incorporated herein by reference.

TECHNICAL FIELD

Embodiments according to the present invention relate to a door sash structure.

BACKGROUND ART

A vehicle door sash has been known that includes an upper frame and a lower sash that guide a door glass for ascending and descending of the door glass, and a door mirror attachment member that is attached to the upper frame and the lower sash and provided with a door mirror. The door mirror attachment member includes an inner reinforcement having a substantially box shape and an outer reinforcement covering an open surface of the inner reinforcement, and has a box shape. The outer reinforcement and the inner reinforcement are attached to the lower sash (Refer to Patent Document 1).

A belt line reinforcement is attached to the outer reinforcement of the door mirror attachment member. The belt line reinforcement extends in a front-rear direction of a vehicle and reinforces a belt line of a door panel. An outer panel of the door panel is attached to the belt line reinforcement.

CITATION LIST

Patent Literature

Patent Document 1: Japanese Patent Application Laid-open No. 2005-271633

SUMMARY OF INVENTION

Problem to be Solved by the Invention

For example, in a certain situation, what is called a sucked-out phenomenon, in which the outer panel is sucked out to the outside of the vehicle due to a negative pressure, occurs during running of a vehicle at a high speed. In the conventional structure, when the sucked-out phenomenon occurs, the belt line reinforcement, the outer reinforcement to which the belt line reinforcement is attached, and the lower sash to which the outer reinforcement is attached are sucked out to the outside of the vehicle.

The invention is made in view of such circumstances, and an objective of the invention is to provide a door sash structure that can reduce a load acting on the sash.

Means for Solving Problem

According to embodiments of the present invention, for example, a door sash structure includes: a sash configured to guide a front end edge of a door glass of a vehicle for ascending and descending of the door glass; a mirror attachment member configured to allow a door mirror to be attached thereto, the mirror attachment member being fixed to the sash; and an outer reinforcement attachment member configured to allow at least one of a door outer panel and an outer reinforcement to be attached thereto, the outer reinforcement extending along the door glass on a side adjacent to an outside of the vehicle of the door glass, the outer reinforcement attachment member being fixed to an outer surface of the mirror attachment member that faces the outside of the vehicle, and separated from the sash. For example, what is called a sucked-out phenomenon may occur during running of the vehicle at a high speed, in which the door outer panel and the outer reinforcement of the door are sucked out to the outside of the vehicle due to a negative pressure. When the sucked-out phenomenon occurs, the outer reinforcement, the outer reinforcement attachment member to which the outer reinforcement is attached, and the mirror attachment member to which the outer reinforcement attachment member is fixed are sucked out to the outside of the vehicle. The sash and the outer reinforcement attachment member are separated and can relatively move. A load due to the sucked-out phenomenon acts on the sash via the door outer panel, the outer reinforcement, the outer reinforcement attachment member, and the mirror attachment member. When the load is applied from the door outer panel to the sash, the load is reduced by the door outer panel, the outer reinforcement, the outer reinforcement attachment member, and the mirror attachment member. As a result, the load acting on the sash is reduced.

In the door sash structure mentioned above, for example, the outer reinforcement attachment member is apart from the sash. As an example, when the outer reinforcement attachment member moves relative to the sash, the contact between the outer reinforcement attachment member and the sash is prevented, and the outer reinforcement attachment member is prevented from applying a load directly to the sash. As a result, the load acting on the sash is reduced.

In the door sash structure mentioned above, for example, the sash includes a first sidewall, a second side wall, and an end wall, the first sidewall extending along an outer surface of the door glass that faces the outside of the vehicle, the second sidewall extending along an inner surface of the door glass that faces an inside of the vehicle, and the end wall being connected to the first sidewall and the second sidewall and extending along the front end edge of the door glass, and the mirror attachment member is fixed to the second sidewall. As an example, in the cross section of the sash, the end wall of the sash extends in substantially the same direction as the mirror attachment member pushes the sash, the end wall, thus, has a high stiffness in the direction. As a result, when the mirror attachment member is sucked out to the outside of the vehicle, the sash is prevented from being deformed as if its substantially C-shaped cross section collapses.

In the door sash structure mentioned above, for example, the outer reinforcement attachment member includes an attachment portion, a first fixing portion, and a second fixing portion, the attachment portion being configured to allow at least one of the door outer panel and the outer reinforcement to be attached thereto, the first fixing portion extending from the attachment portion and being fixed to the mirror attachment member, and the second fixing portion extending from the attachment portion and being fixed to the mirror attachment member, the attachment portion has an outer surface facing the outside of the vehicle, and a virtual line connecting the first fixing portion and the second fixing portion intersects the attachment portion when the outer reinforcement attachment member is viewed in a direction normal to the outer surface of the attachment portion. As an example, when the door outer panel and the outer reinforcement are sucked out to the outside of the vehicle, this structure prevents the outer reinforcement attachment member from being bent with the first fixing portion or the second fixing portion serving as a fulcrum.

The door sash structure mentioned above, for example, further includes a frame member that is configured to guide the door glass together with the sash for ascending and descending of the door glass and to which the sash is fixed, the outer reinforcement attachment member includes a first extending portion that extends in a direction intersecting a direction in which the sash extends, and the mirror attachment member includes a second extending portion and a door mirror attachment portion, the second extending portion extending from the frame member, and the door mirror attachment portion being surrounded by the sash, the first extending portion, and the second extending portion and configured to allow the door mirror to be attached thereto. As an example, the door mirror attachment portion is surrounded by the first extending portion, the second extending portion, and the sash, which extend in certain directions. This structure makes it easier to seal respective gaps between the door mirror and each of the first extending portion, the second extending portion and the sash than a case where the members surrounding the door mirror attachment portion have complicated shapes. As a result, sealing property of the door mirror attachment portion is improved.

BRIEF DESCRIPTION OF DRAWINGS

FIG. 1 is a side view of a vehicle according to an embodiment;
FIG. 7 is a cross-sectional view of a part of the door sash in the embodiment which is taken along the line F7-F7 in FIG. 4;
and
FIG. 8 is a cross-sectional view of a part of the front door in the embodiment which is taken along the line F8-F8 in FIG. 4.

DESCRIPTION OF EMBODIMENT

The following describes an embodiment with reference to FIGS. 1 to 8. In the present specification, constituent elements according to the embodiment and descriptions thereof are described with multiple expressions in some cases. The constituent elements and descriptions thereof described with multiple expressions may be described with other expressions other than those described herein. Constituent elements and descriptions thereof that are not described with multiple expressions may also be described with other expressions other than those described herein.

FIG. 1 is a side view of a vehicle 1 according to the embodiment. As illustrated in FIG. 1, the vehicle 1 is a four-wheel automobile. The vehicle 1 is not limited to this example. The vehicle 1 has front doors 2, rear doors 3, and door mirrors 4. The vehicle 1 may not have the rear doors 3.

As illustrated in each drawing, an X-axis, a Y-axis, and a Z-axis are defined in the specification. The X-axis, the Y-axis, and the Z-axis are orthogonal to one another. The X-axis is along the width of the vehicle 1. The Y-axis is along the length of the vehicle 1. The Z-axis is along the height of the vehicle 1. Hereinafter, the direction along the Y axis is described as a front-rear direction of the vehicle 1. The direction along the Z axis is described as an upper-lower direction of the vehicle 1.

The front doors 2 are provided in front of the rear doors 3 in the front-rear direction of the vehicle 1. In FIG. 1, the direction indicated with the arrow of the Y axis is described as a front direction. The direction opposite the arrow of the Y axis is described as a rear direction. The door mirrors 4 are attached to the respective front doors 2.

Figure 2:
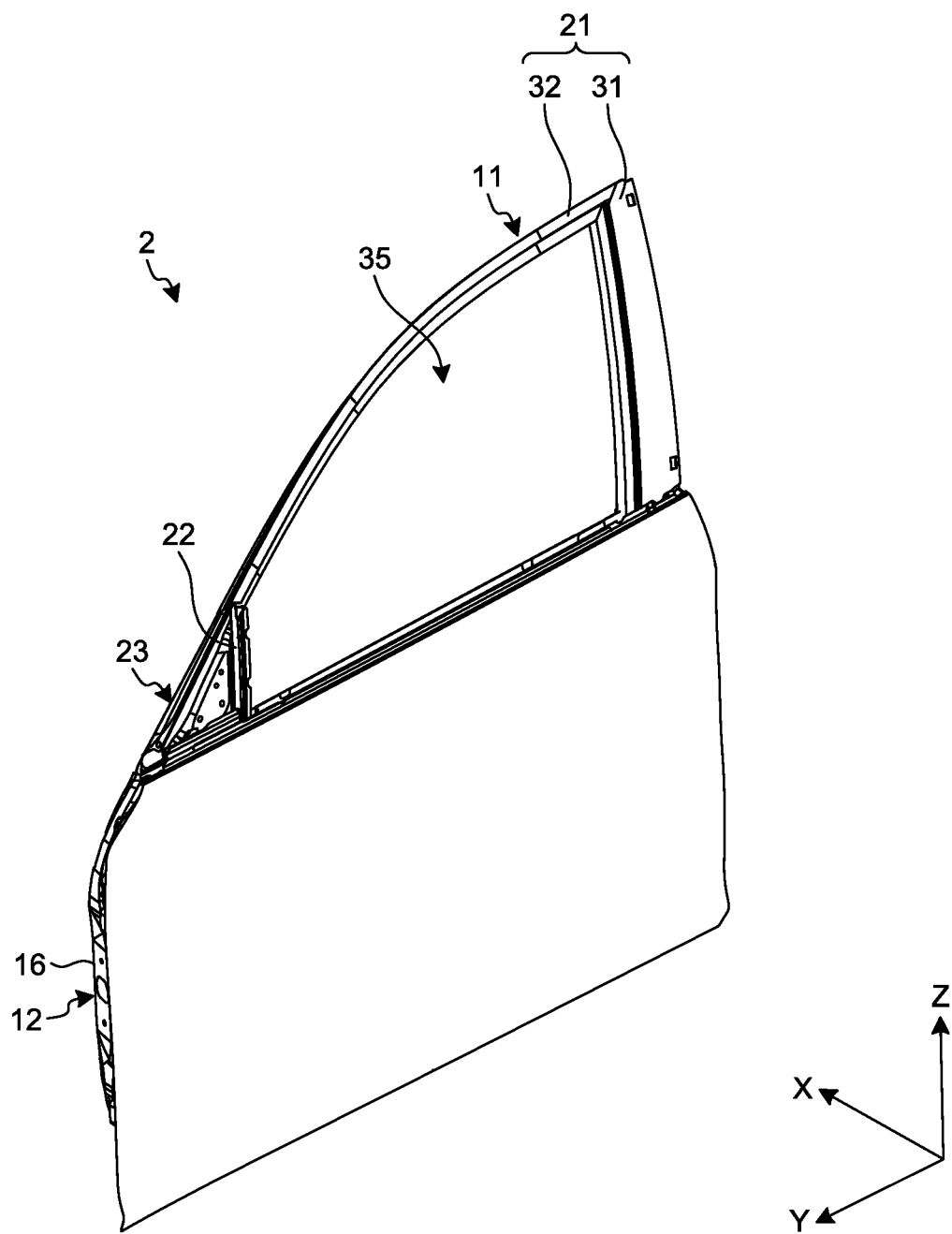
FIG. 2 is a perspective view of a front door in the embodiment.

FIG. 2 is a perspective view of the front door 2 in the embodiment. As illustrated in FIG. 2, the front door 2 has a door sash 11 and a door panel 12. The front door 2 also has a door glass 13 illustrated in FIG. 1. The door sash 11 may also be described as a door sash structure.

The door panel 12 is attached to the door sash 11. The door panel 12 has an outer panel 15 illustrated in FIG. 1 and an inner panel 16 illustrated in FIG. 2. The outer panel 15 is attached to the door sash 11 from the outside (an outdoor side) of the vehicle 1. The outer panel 15 may also be described as a door outer panel. The inner panel 16 is attached to the door sash 11 from an inside (an indoor side) of the vehicle 1. The inner panel 16 may also be described as a door inner panel.

Figure 3:
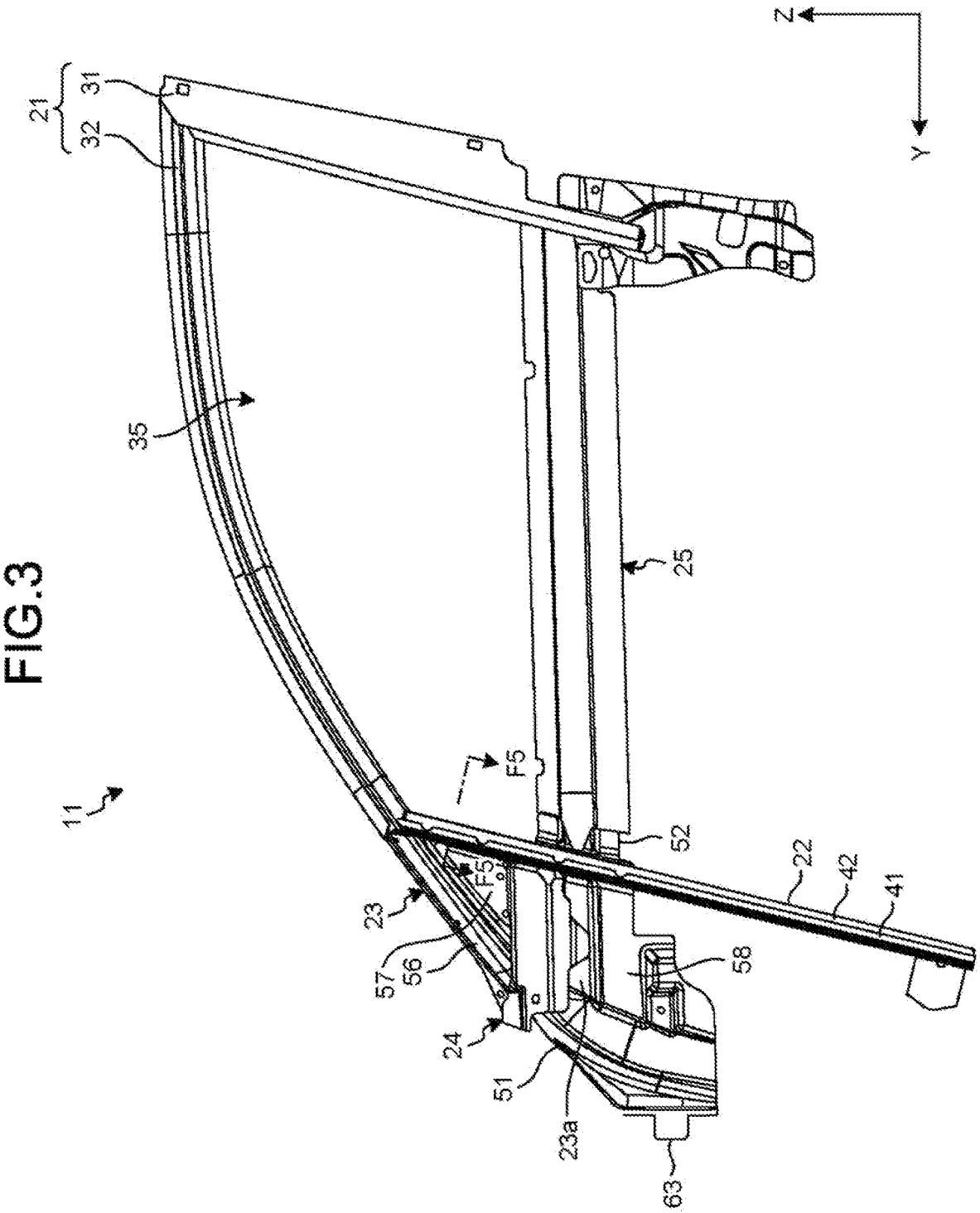
FIG. 3 is a side view of a door sash in the embodiment.

FIG. 3 is a side view of the door sash 11 in the embodiment. As illustrated in FIG. 3, the door sash 11 has an upper frame 21, a lower sash 22, a mirror bracket 23, a reinforcement bracket 24, and an inner belt line reinforcement (hereinafter described as an inner reinforcement) 25.

The upper frame 21 may also be described as a frame member. The lower sash 22 may also be described as a sash, a sash member, or a channel. The mirror bracket 23 may also be described as a door mirror attachment member, a door constituting member, another member, a mirror attachment member, or an attachment member. The reinforcement bracket 24 may also be described as an outer reinforcement attachment member.

The upper frame 21 has a rear sash 31 and an upper sash 32. The rear sash 31 and the upper sash 32 are each made of aluminum and manufactured by roll forming, for example. The material and the manufacturing method of the rear sash 31 and the upper sash 32 are not limited to this example.

The rear sash 31 extends in a substantially upper-lower direction and forms a rear edge portion of the door sash 11. The upper sash 32 extends in a substantially front-rear direction and forms an upper edge portion and a front edge portion of the door sash 11. The rear end portion of the upper sash 32 is connected to the upper end portion of the rear sash 31.

Figure 4:
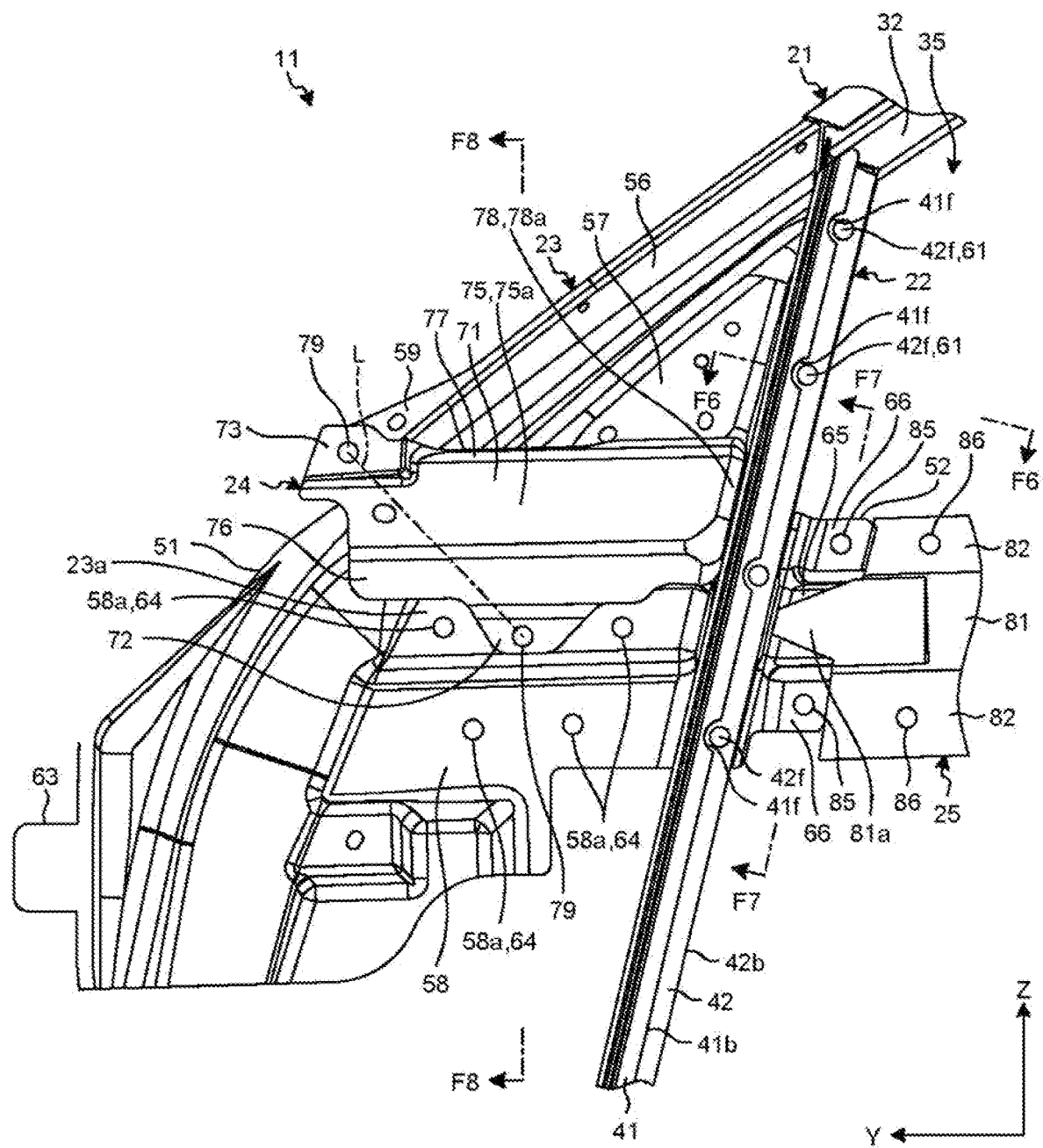
FIG. 4 is a side view of a part of the door sash in the embodiment.

FIG. 4 is a side view of a part of the door sash 11 in the embodiment. The lower sash 22 illustrated in FIG. 4 is made of aluminum and manufactured by roll forming, for example. The material and the manufacturing method of the lower sash 22 is not limited to this example. For example, the lower sash 22 may be manufactured by extrusion molding or pultrusion molding.

The lower sash 22 extends in a substantially upper-lower direction. The upper end portion of the lower sash 22 is connected to the front end portion of the upper sash 32. In other words, the lower sash 22 is fixed to the upper frame 21.

A window hole 35 surrounded by the upper frame 21, the lower sash 22, and the outer panel 15 illustrated in FIG. 1 is provided to the front door 2. The door glass 13 illustrated in FIG. 1 is disposed between the lower sash 22 and the rear sash 31 of the upper frame 21. The lower sash 22 and the rear sash 31 of the upper frame 21 guide the door glass 13 for ascending and descending of the door glass 13 in the window hole 35.

Figure 5:
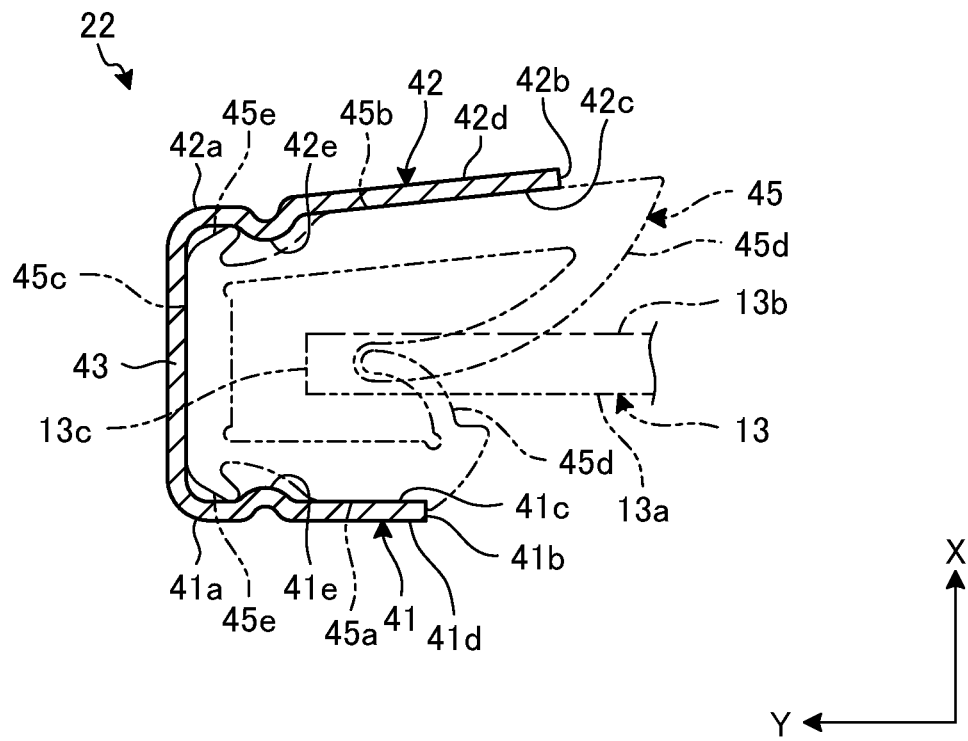
FIG. 5 is a cross-sectional view of a lower sash in the embodiment which is taken along the line F5-F5 in FIG. 3.

FIG. 5 is a cross-sectional view of the lower sash 22 in the embodiment which is taken along the line F5-F5 in FIG. 3. As illustrated in FIG. 5, the lower sash 22 has a substantially C-shaped cross section and has a first sidewall 41, a second sidewall 42, and an end wall 43.

The first sidewall 41 extends along an outer surface 13a of the door glass 13, the outer surface 13a facing the outside of the vehicle 1, in a cross section perpendicular to a longitudinal direction of the lower sash 22. The outer surface 13a of the door glass 13 faces the first sidewall 41. The first sidewall 41 has a first end portion 41a, a second end portion 41b, a first inner surface 41c, a first outer surface 41d, and a first locking portion 41e.

The first end portion 41a is the front end portion of the first sidewall 41 in the cross section illustrated in FIG. 5. The second end portion 41b is located on the side opposite to the first end portion 41a. The second end portion 41b is the rear end portion of the first sidewall 41 in the cross section illustrated in FIG. 5.

The first inner surface 41c faces the outer surface 13a of the door glass 13. The first inner surface 41c faces the second sidewall 42 through the door glass 13. The first outer surface 41d is located on the side opposite to the first inner surface 41c. The first outer surface 41d faces the outside of the vehicle 1.

The first locking portion 41e is located between the first end portion 41a and the second end portion 41b. The first locking portion 41e protrudes from the first inner surface 41c. The first locking portion 41e extends in a direction along which the lower sash 22 extends (the longitudinal direction of the lower sash 22) and is provided substantially all over the first sidewall 41 in the longitudinal direction of the lower sash 22. The first locking portion 41e is not limited to this example.

The second sidewall 42 extends along an inner surface 13b of the door glass 13, the inner surface 13b facing the inside of the vehicle 1, in the cross section perpendicular to the longitudinal direction of the lower sash 22. The inner surface 13b of the door glass 13 faces the second sidewall 42. The second sidewall 42 has a third end portion 42a, a fourth end portion 42b, a second inner surface 42c, a second outer surface 42d, and a second locking portion 42e.

The third end portion 42a is the front end portion of the second sidewall 42 in the cross section illustrated in FIG. 5. The fourth end portion 42b is located on the side opposite to the third end portion 42a. The fourth end portion 42b is the rear end portion of the second sidewall 42 in the cross section illustrated in FIG. 5.

The second inner surface 42c faces the inner surface 13b of the door glass 13. The second inner surface 42c faces the first sidewall 41 through the door glass 13. The second outer surface 42d is located on the side opposite to the second inner surface 42c. The second outer surface 42d faces the inside of the vehicle 1.

The second locking portion 42e is located between the third end portion 42a and the fourth end portion 42b. The second locking portion 42e protrudes from the second inner surface 42c. The second locking portion 42e extends in the direction in which the lower sash 22 extends and is provided substantially all over the second sidewall 42 in the longitudinal direction of the lower sash 22. The second locking portion 42e is not limited to this example.

The end wall 43 extends along a front end edge 13c of the door glass 13, the front end edge 13c substantially facing the front side. In other words, the front end edge 13c of the door glass 13 faces the end wall 43. The front end edge 13c may also be described as an end surface. The front end edge 13c is the edge of the door glass 13 that substantially faces the front side in the front-rear direction of the vehicle 1. The front end edge 13c is connected to the front end of the outer surface 13a and the front end of the inner surface 13b. The lower sash 22 guides the front end edge 13c of the door glass 13 for ascending and descending of the door glass 13. In the cross section illustrated in FIG. 5, the end wall 43 extends in the width direction of the vehicle 1.

The end wall 43 is connected to the first end portion 41a of the first sidewall 41 and the third end portion 42a of the second sidewall 42. In other words, the first sidewall 41 and the second sidewall 42 extend from the end wall 43.

The distance between the third end portion 42a and the fourth end portion 42b is longer than the distance between the first end portion 41a and the second end portion 41b. In other words, the second sidewall 42 extends from the end wall 43 in such a manner that the length of the second sidewall 42 is longer than that of the first sidewall 41.

The second sidewall 42 extends in such a direction that the distance between the first sidewall 41 and the second sidewall 42 increases as the second sidewall 42 extends farther away from the end wall 43. In the embodiment, the first sidewall 41 extends in the direction orthogonal to the end wall 43 while the second sidewall 42 extends in the direction substantially obliquely intersecting the end wall 43. The second sidewall 42 may be bent at least one part thereof so long as the second sidewall 42 extends in the direction obliquely intersecting the end wall 43 as a whole. The extending directions of the first sidewall 41 and the second sidewall 42 are not limited to this example.

The vehicle 1 also has a glass run 45, which is illustrated with the two dot chain line in FIG. 5. The glass run 45 is made of an elastic material such as elastomer. The glass run 45 is attached to the lower sash 22 and interposed between the lower sash 22 and the door glass 13. The glass run 45 has a first frame wall 45a, a second frame wall 45b, a third frame wall 45c, a plurality of lips 45d, and a plurality of protrusions 45e.

The first frame wall 45a extends along the first inner surface 41c of the first sidewall 41. The second frame wall 45b extends along the second inner surface 42c of the second sidewall 42. The third frame wall 45c extends along the end wall 43 and is connected to the first frame wall 45a and the second frame wall 45b.

The lips 45d are provided to the end portion of the first frame wall 45a and the end portion of the second frame wall 45b. The lips 45d may be further provided to other places of the first frame wall 45a and the second frame wall 45b.

The door glass 13 is disposed between the first frame wall 45a and the second frame wall 45b. The lips 45d each extend toward the door glass 13 and are each in contact with the door glass 13. As a result, the lips 45d are elastically deformed and elastically hold the door glass 13. The glass run 45 guides the door glass 13 together with the lower sash 22 for ascending and descending of the door glass 13.

One of the protrusions 45e protrudes from the first frame wall 45a or the third frame wall 45c toward the first sidewall 41 and is caught by the first locking portion 41e. The other of the protrusions 45e protrudes from the second frame wall

45b or the third frame wall 45c toward the second sidewall 42 and is caught by the second locking portion 42e. As a result, the glass run 45 is locked and held by the first locking portion 41e and the second locking portion 42e.

As illustrated in FIG. 3, the mirror bracket 23 has a mirror attachment portion 51 formed in a substantially triangle shape and an inner reinforcement attachment portion 52 extending from the mirror attachment portion 51. The mirror attachment portion 51 and the inner reinforcement attachment portion 52 are integrally formed.

Figure 6:
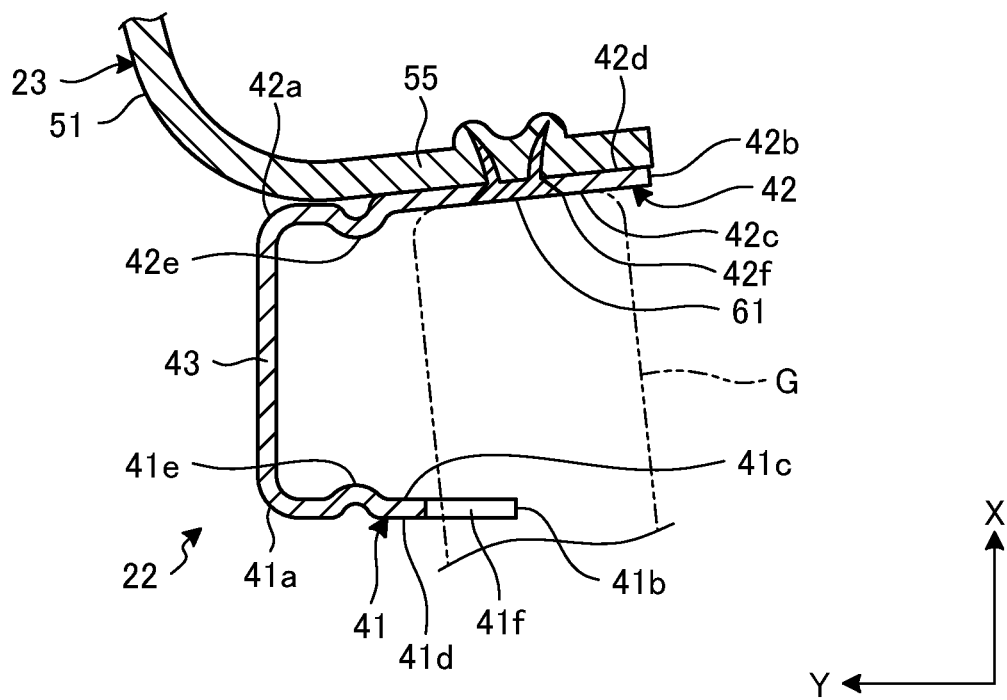
FIG. 6 is a cross-sectional view of the lower sash and a mirror bracket in the embodiment which is taken along the line F6-F6 in FIG. 4.

FIG. 6 is a cross-sectional view of the lower sash 22 and the mirror bracket 23 in the embodiment which is taken along the line F6-F6 in FIG. 4. The mirror attachment portion 51 has a sash support portion 55 illustrated in FIG. 6, and a pillar portion 56, a door mirror attachment portion 57, a lower portion 58, and a fixing piece 59 that are illustrated in FIG. 4. The pillar portion 56 may also be described as a second extending portion.

As illustrated in FIG. 6, the sash support portion 55 extends along the second sidewall 42 of the lower sash 22 and is in contact with the second outer surface 42d. The second sidewall 42 has a plurality of fixing portions 42f. At the fixing portions 42f, the second sidewall 42 is fixed to the sash support portion 55 with rivets 61, for example. The rivets 61 are self-pierce rivets (SPR), for example. The fixing portions 42f may be fixed to the sash support portion 55 by other means such as spot welding.

The fixing portions 42f are located between the fourth end portion 42b and the second locking portion 42e. As illustrated in FIG. 4, a plurality of fixing portions 42f are arranged in the extending direction of the lower sash 22 at intervals.

As illustrated in FIG. 6, the sash support portion 55 is fixed to the fixing portions 42f while the sash support portion 55 is in contact with the second outer surface 42d of the second sidewall 42. The sash support portion 55 is fixed to the second sidewall 42 from the inside of the vehicle 1. In other words, the sash support portion 55 is fixed to the lower sash 22 on the side of the lower sash 22 that faces the inside of the vehicle 1. This fixing direction is not the direction in which the rivets 61 are driven but the direction in which the sash support portion 55 is in contact with the second sidewall 42.

The first sidewall 41 is provided with a plurality of notches 41f. The notches 41f may also be described as openings. Each of the notches 41f is a notch depressed from the second end portion 41b to have a substantially circular arc shape. The notches 41f may have another shape. The first sidewall 41 may be provided with holes serving as openings. The notches 41f serving as openings expose the fixing portions 42f in a direction normal to the second inner surface 42c of the second sidewall 42.

The notches 41f are arranged apart from the first locking portion 41e. In other words, the notches 41f are disposed closer to the second end portion 41b than the first locking portion 41e is. The end portions of the notches 41f may be in contact with the first locking portion 41e. The notches 41f may be formed over the first locking portion 41e.

For example, a gun G is inserted through the notch 41f and drives the rivet 61 into the fixing portion 42f and the sash support portion 55. The gun G may be inserted through the notch 41f and spot-weld the fixing portion 42f and the sash support portion 55.

As illustrated in FIG. 4, the pillar portion 56 is connected to the front end portion of the upper sash 32 together with the lower sash 22. The pillar portion 56 extends from the upper sash 32 of the upper frame 21. The pillar portion 56 forms the front edge portion of the door sash 11 together with the upper sash 32. A hinge 63 is attached to the front end portion of the pillar portion 56. The hinge 63 is fixed to the vehicle body of the vehicle 1.

The door mirror attachment portion 57 is provided between the sash support portion 55 and the pillar portion 56. The door mirror attachment portion 57 is, thus, located on the opposite side of the lower sash 22 from the door glass 13. In other words, the door mirror attachment portion 57 is located on the front side of the lower sash 22 in the front-rear direction of the vehicle 1. The door mirror attachment portion 57 is formed to be a substantially flat plate of a triangle shape. The door mirror 4 illustrated in FIG. 1 is attached to the door mirror attachment portion 57.

The lower portion 58 extends substantially downward from the door mirror attachment portion 57 and is provided between the sash support portion 55 and the pillar portion 56. The lower portion 58 is, thus, located on the opposite side of the lower sash 22 from the door glass 13.

The lower portion 58 is provided with a plurality of fixing portions 58a. The fixing portions 58a are attached to the inner panel 16 illustrated in FIG. 2 with rivets 64, for example. The fixing portions 58a may be attached to the inner panel 16 by other means such as spot welding.

The fixing piece 59 extends in a substantially front direction from the pillar portion 56. In the upper-lower direction of the vehicle 1, the fixing piece 59 is disposed at substantially the same position as the lower end portion of the door mirror attachment portion 57. The position of the fixing piece 59 is not limited to this example.

The inner reinforcement attachment portion 52 extends in the rear direction from the sash support portion 55 of the mirror attachment portion 51. The inner reinforcement attachment portion 52 is not limited to this example. The inner reinforcement attachment portion 52 is located on the same side of the lower sash 22 as the door glass 13.

FIG. 7 is a cross-sectional view of a part of the door sash 11 in the embodiment which is taken along the line F7-F7 in FIG. 4. As illustrated in FIG. 7, the inner reinforcement attachment portion 52 is located at (shifted to) a more inner position of the vehicle 1 than the mirror attachment portion 51.

The inner reinforcement attachment portion 52 has a reinforcement attachment wall 65 and two panel attachment walls 66. The reinforcement attachment wall 65 may also be described as a first portion. The panel attachment wall 66 may also be described as a second portion.

The reinforcement attachment wall 65 is disposed at a position slightly shifted to the inside of the vehicle 1 from the sash support portion 55 in the width direction of the vehicle 1. The reinforcement attachment wall 65 has an outer surface 65a and an inner surface 65b. The outer surface 65a faces the outside of the vehicle 1. The inner surface 65b is located on the side opposite to the outer surface 65a and faces the inside of the vehicle 1. The outer surface 65a and the inner surface 65b are each formed to be substantially flat.

The two panel attachment walls 66 are located at the positions shifted toward the inside of the vehicle 1 from the end portions of the reinforcement attachment wall 65 that are positioned in the upper-lower direction of the vehicle 1, respectively. In other words, the panel attachment walls 66 protrude from the reinforcement attachment wall 65 to the inside of the vehicle 1. The panel attachment walls 66 are arranged at a more inner position of the vehicle 1 than the reinforcement attachment wall 65 in the width direction of the vehicle 1.

Each of the panel attachment walls 66 has an outer surface 66a and an inner surface 66b. The outer surfaces 66a face the outside of the vehicle 1. The inner surfaces 66b are located on the side opposite to the outer surfaces 66a and face the inside of the vehicle 1. The outer surfaces 66a and the inner surfaces 66b are each formed to be substantially flat.

As illustrated in FIG. 4, the reinforcement bracket 24 is a component which is separated from the lower sash 22, and is not fixed to the lower sash 22 but is fixed to an outer surface 23a of the mirror bracket 23. The outer surface 23a of the mirror bracket 23 faces the outside of the vehicle 1. While the reinforcement bracket 24 is connected to the lower sash 22 via the mirror bracket 23, the reinforcement bracket 24 is a component which is separated from the lower sash 22. In other words, the reinforcement bracket 24 is not integrated with the lower sash 22, and is only connected to the lower sash 22 indirectly but is not connected to the lower sash 22 directly.

For example, when the lower sash 22 is elastically deformed, the reinforcement bracket 24 does not directly follow the elastic deformation of the lower sash 22, and the lower sash 22 and the reinforcement bracket 24 move relatively to each other and slightly. When the mirror bracket 23 is elastically deformed, the reinforcement bracket 24 directly follows the elastic deformation of the mirror bracket 23, and the lower sash 22 and the reinforcement bracket 24 move relatively to each other and slightly.

The reinforcement bracket 24 is located at a more outer position of the vehicle 1 than the mirror bracket 23. The reinforcement bracket 24 has an extending portion 71, a first fixing portion 72, and a second fixing portion 73. The extending portion 71 may also be described as a first extending portion or an attachment portion.

The extending portion 71 is located below the door mirror attachment portion 57 and disposed on the upper end portion side of the lower portion 58. The extending portion 71 extends in the front-rear direction of the vehicle 1. The extending direction of the extending portion 71 intersects the extending direction of the lower sash 22. The door mirror attachment portion 57 is surrounded by the lower sash 22, the pillar portion 56 of the mirror bracket 23, and the extending portion 71 of the reinforcement bracket 24, and depressed to the inside of the vehicle 1 from the lower sash 22, the pillar portion 56, and the extending portion 71.

The extending portion 71 has an attachment wall 75, a first peripheral wall 76, a second peripheral wall 77, and a third peripheral wall 78. The first peripheral wall 76, the second peripheral wall 77, and the third peripheral wall 78 extend from the attachment wall 75 and are connected to one another.

FIG. 8 is a cross-sectional view of a part of the front door 2 in the embodiment which is taken along the line F8-F8 in FIG. 4. As illustrated in FIG. 8, the attachment wall 75 is apart from the mirror bracket 23 toward the outside of the vehicle 1, and extends in the front-rear direction of the vehicle 1. The attachment wall 75 covers two holes 23b provided to the mirror bracket 23.

The attachment wall 75 has an outer surface 75a and an inner surface 75b. The outer surface 75a faces the outside of the vehicle 1. The inner surface 75b is located on the side opposite to the outer surface 75a and faces the inside of the vehicle 1. The inner surface 75b faces the mirror bracket 23 with a distance therebetween.

The first peripheral wall 76 extends toward the mirror bracket 23 from the lower end portion of the attachment wall 75. The second peripheral wall 77 extends toward the mirror bracket 23 from the upper end portion of the attachment wall 75.

As illustrated in FIG. 4, the third peripheral wall 78 extends toward the mirror bracket 23 from the rear end portion of the attachment wall 75. The third peripheral wall 78 has a side surface 78a. The side surface 78a is closer to the lower sash 22 than any portion of the mirror bracket 23.

The side surface 78a faces in a substantially rear direction and faces the lower sash 22. The side surface 78a is, however, apart from the lower sash 22. In this way, the reinforcement bracket 24 is apart from the lower sash 22.

The first fixing portion 72 extends substantially downward from a substantially central portion of the first peripheral wall 76 in the front-rear direction of the vehicle 1. The first fixing portion 72 is fixed to the lower portion 58 of the mirror bracket 23 with a rivet 79, for example. The first fixing portion 72 may be fixed to the lower portion 58 by other means such as spot welding.

The second fixing portion 73 extends substantially upward from the front and upper end portion of the attachment wall 75. The second fixing portion 73 is fixed to the fixing piece 59 of the mirror bracket 23 with the rivet 79, for example. The second fixing portion 73 may be fixed to the lower portion 58 by other means such as spot welding.

The first fixing portion 72 and the second fixing portion 73 are arranged at different positions in the upper-lower direction of the vehicle 1. The first fixing portion 72 and the second fixing portion 73 are arranged at different positions in the front-rear direction of the vehicle 1.

As illustrated in FIG. 4, a virtual line L connecting the first fixing portion 72 and the second fixing portion 73 intersects the attachment wall 75 when the reinforcement bracket 24 is viewed in the direction normal to the outer surface 75a of the attachment wall 75. The virtual line L connects the position (rivet 79) at which the first fixing portion 72 is fixed to the mirror bracket 23 and the position (rivet 79) at which the second fixing portion 73 is fixed to the mirror bracket 23.

As illustrated in FIG. 3, the inner reinforcement 25 extends in the front-rear direction of the vehicle 1. The inner reinforcement 25 extends along the inner surface 13b of the door glass 13 at a more inner position of the vehicle 1 than the door glass 13.

The inner reinforcement 25 is located on the door glass 13 side of the lower sash 22. In other words, the inner reinforcement 25 is located on the rear direction side of the lower sash 22 in the front-rear direction of the vehicle 1. The inner reinforcement 25, thus, does not cover the mirror attachment portion 51 of the mirror bracket 23 from the inside of the vehicle 1. The inner reinforcement 25 is not limited to this example.

The front end portion of the inner reinforcement 25 is fixed to the inner reinforcement attachment portion 52 of the mirror bracket 23. The rear end portion of the inner reinforcement 25 is fixed to the rear sash 31.

As illustrated in FIG. 4, the inner reinforcement 25 has a bracket attachment wall 81 and two panel attachment walls 82. The bracket attachment wall 81 extends in the front-rear direction of the vehicle 1 and is disposed at a position closer to the door glass 13 than the panel attachment walls 82.

The bracket attachment wall 81 has a protruding piece 81a. The protruding piece 81a may also be described as a fixing portion. The protruding piece 81a protrudes from the front end of the bracket attachment wall 81 in the front direction. The protruding piece 81a is formed to be a plate of a substantially triangle shape, for example. The protruding piece 81a may be formed in another shape.

As illustrated in FIG. 7, the protruding piece 81a is in contact with the outer surface 65a of the reinforcement attachment wall 65 of the inner reinforcement attachment portion 52. In other words, the protruding piece 81a is in contact with the reinforcement attachment wall 65 from the outside of the vehicle 1. The bracket attachment wall 81 including the protruding piece 81a is, thus, disposed at substantially the same position as the sash support portion 55 in the width direction of the vehicle 1. The inner reinforcement 25 is located at a more inner position of the vehicle 1 than the door glass 13 and the glass run 45.

The protruding piece 81a is fixed to the outer surface 65a of the reinforcement attachment wall 65 by metal inert gas (MIG) welding, for example. The protruding piece 81a may be fixed to the reinforcement attachment wall 65 with other means such as a rivet.

As described above, the inner reinforcement 25 is fixed to the inner reinforcement attachment portion 52 of the mirror bracket 23 from the outside of the vehicle 1. The inner reinforcement 25 is fixed to the rear sash 31 illustrated in FIG. 3 from the outside of the vehicle 1 by MIG welding, for example. In this way, the inner reinforcement 25 is fixed to the mirror bracket 23 and the rear sash 31 from the same direction in the width direction of the vehicle 1.

As illustrated in FIG. 4, the two panel attachment walls 82 are respectively disposed at the positions shifted toward the inside of the vehicle 1 from the corresponding end portions of the bracket attachment wall 81 in the upper-lower direction of the vehicle 1. In other words, the panel attachment walls 82 protrude to the inside of the vehicle 1 from the bracket attachment wall 81. The panel attachment walls 82 are disposed at more inner positions of the vehicle 1 than the bracket attachment wall 81 in the width direction of the vehicle 1.

The inner panel 16 illustrated in FIG. 2 is located at a more inner position of the vehicle 1 than the inner reinforcement 25. The inner panel 16 is in contact with the panel attachment walls 66 of the inner reinforcement attachment portion 52 of the mirror bracket 23 and the panel attachment walls 82 of the inner reinforcement 25 from the inside of the vehicle 1.

As illustrated in FIG. 7, the panel attachment walls 66 of the inner reinforcement attachment portion 52 of the mirror bracket 23 are attached to the inner panel 16 with rivets 85, for example. As illustrated in FIG. 4, the panel attachment walls 82 of the inner reinforcement 25 are attached to the inner panel 16 with rivets 86, for example. The panel attachment walls 66 and 82 may be attached to the inner panel 16 by other means such as spot welding.

As described above, the inner panel 16 is fixed to the panel attachment walls 66 of the mirror bracket 23 and the panel attachment walls 82 of the inner reinforcement 25 on the door glass 13 side of the lower sash 22. The inner panel 16 is fixed to the lower portion 58 of the mirror bracket 23 on the side opposite to the door glass 13 side of the lower sash 22. Since the inner panel 16 is fixed to the multiple components at multiple positions, the stiffness of the front door 2 increases.

As illustrated in FIG. 8, the front door 2 further has an outer waistline reinforcement (hereinafter described as an outer reinforcement) 90. The outer reinforcement 90 extends in the front-rear direction of the vehicle 1. The outer reinforcement 90 extends along the outer surface 13a of the door glass 13 at a more outer position of the vehicle 1 than the door glass 13.

The front end portion of the outer reinforcement 90 is attached to the reinforcement bracket 24. The rear end portion of the outer reinforcement 90 is attached to the rear sash 31.

The outer reinforcement 90 is in contact with the outer surface 75a of the attachment wall 75 of the reinforcement bracket 24. The attachment wall 75 extends along the outer reinforcement 90. The outer reinforcement 90 is attached to the attachment wall 75 of the reinforcement bracket 24 with rivets 91, for example.

The hole 23b of the mirror bracket 23 exposes the rivet 91 provided to the attachment wall 75 to the inside of the vehicle 1. For example, the gun G is inserted through the hole 23b and drives the rivet 91 into the attachment wall 75 and the outer reinforcement 90. The gun G may be inserted through the hole 23b and spot weld the attachment wall 75 and the outer reinforcement 90.

The outer panel 15 is attached to the outer reinforcement 90 by hemming bending, for example. The outer panel 15 is, thus, attached to the reinforcement bracket 24 with the outer reinforcement 90 interposed therebetween. The outer panel 15 may be directly attached to the reinforcement bracket 24.

In a certain situation, during running of the vehicle 1 at a high speed, what is called a sucked-out phenomenon, in which the front door 2 is sucked out to the outside of the vehicle 1 due to a negative pressure, occurs. The front door 2 is fixed to the vehicle body at the front end portion and rear end portion thereof with the hinge 63 illustrated in FIG. 3 and other members. A larger load acts on the substantially central portion of the front door 2 in the front-rear direction of the vehicle 1 and the substantially upper end portions of the door sash 11 and the door glass 13.

The sucked-out phenomenon causes the outer panel 15 connected to the door sash 11 to be sucked out to the outside of the vehicle 1. The load due to the sucked-out phenomenon acts on the mirror bracket 23 via the outer panel 15, the outer reinforcement 90, and the reinforcement bracket 24.

As a result of action of the load on the mirror bracket 23, the sash support portion 55 of the mirror bracket 23 pushes the lower sash 22 toward the outside of the vehicle 1. However, since the mirror bracket 23 is fixed to the vehicle body by the hinge 63, the load acting on the lower sash 22 from the mirror bracket 23 is reduced.

The reinforcement bracket 24 is apart from the lower sash 22. This structure prevents the reinforcement bracket 24 from directly applying a load to the lower sash 22.

The outer reinforcement 90, the reinforcement bracket 24, and the mirror bracket 23 each have ridges and valleys that are formed by bending and form what is called a channel structure. With this structure, the load applied to the lower sash 22 is reduced when the load acts via the outer panel 15, the outer reinforcement 90, the reinforcement bracket 24, and the mirror bracket 23 on the lower sash 22.

As described above, even when the sucked-out phenomenon occurs, the load due to the sucked-out phenomenon acting on the lower sash 22 is reduced. As a result, the lower sash 22 is prevented from being deformed.

In the door sash 11 according to the embodiment, the reinforcement bracket 24 is separated from the lower sash 22 while the reinforcement bracket 24 is fixed to the mirror bracket 23. The reinforcement bracket 24 is not fixed to the lower sash 22. When the sucked-out phenomenon occurs, the outer reinforcement 90, the reinforcement bracket 24 to which the outer reinforcement 90 is attached, and the mirror bracket 23 to which the reinforcement bracket 24 is fixed are sucked out to the outside of the vehicle 1. Since the lower sash 22 and the reinforcement bracket 24 are separated, they can relatively move. As a result, the load due to the sucked-out phenomenon is applied to the lower sash 22 via the outer panel 15, the outer reinforcement 90, the reinforcement bracket 24, and the mirror bracket 23. When the load is applied from the outer panel 15 to the lower sash 22, the load is reduced by the outer panel 15, the outer reinforcement 90, the reinforcement bracket 24, and the mirror bracket 23. As a result, the load acting on the lower sash 22 is reduced.

The reinforcement bracket 24 is apart from the lower sash 22. When the reinforcement bracket 24 moves toward the lower sash 22, the reinforcement bracket 24 is prevented from contacting the lower sash 22 and from directly applying the load to the lower sash 22. As a result, the load acting on the lower sash 22 is reduced.

The mirror bracket 23 is fixed to the second sidewall 42 of the lower sash 22, the second sidewall 42 extending along the inner surface 13b of the door glass 13. When the sucked-out phenomenon occurs, the mirror bracket 23 sucked out to the outside of the vehicle 1 pushes the lower sash 22 toward the outside of the vehicle 1. The end wall 43 of the lower sash 22 extends along the front end edge 13c of the door glass 13. Since the end wall 43 extends in substantially the same direction as the mirror bracket 23 pushes the lower sash 22 in the cross section of the lower sash 22, the end wall 43 has a high stiffness in the direction. As a result, the lower sash 22 is prevented from being deformed as if its substantially C-shaped cross section collapses when the mirror bracket 23 is sucked out to the outside of the vehicle 1.

The reinforcement bracket 24 has the extending portion 71, and the first fixing portion 72 and the second fixing portion 73 that extend from the extending portion 71 and are fixed to the mirror bracket 23. When the reinforcement bracket 24 is viewed in the direction normal to the outer surface 75a of the extending portion 71, the virtual line L connecting the first fixing portion 72 and the second fixing portion 73 intersects the extending portion 71. When the outer panel 15 and the outer reinforcement 90 are sucked out to the outside of the vehicle 1, this structure prevents the reinforcement bracket 24 from being bent with the first fixing portion 72 or the second fixing portion 73 as a fulcrum.

The extending portion 71 extends in the direction intersecting the extending direction of the lower sash 22. The pillar portion 56 extends from the upper frame 21. The door mirror attachment portion 57 is, thus, surrounded by the extending portion 71, the pillar portion 56, and the lower sash 22, each of which extends in the certain direction. This structure makes it easier to seal respective gaps between the door mirror 4, and the extending portion 71, the pillar portion 56, and the lower sash 22 than a case where the members surrounding the door mirror attachment portion 57 have complicated shapes. As a result, sealing property of the door mirror attachment portion 57 is improved.

The fixing portion 42f of the second sidewall 42 is located farther away from the first sidewall 41 as the fixing portion 42f is located farther away from the end wall 43. With this structure, since the gun G can be easily set on the second sidewall 42 even when the length of the second sidewall 42 protruding from the end wall 43 is short, the second sidewall 42 can be easily fixed to the member that constitutes at least a part of the front door 2 (door constituting member) such as the mirror bracket 23, and an increase in size of the lower sash 22 is prevented. In the embodiment, the fixing portions 42f are fixed to the mirror bracket 23. The fixing portions 42f may be fixed to another door constituting member such as a door frame (cover) covering the lower sash 22. The rear sash 31 or the upper sash 32 of the upper frame 21 may have the first sidewall 41, the second sidewall 42, and the end wall 43. The channel may be the rear sash 31 or the upper sash 32. The door constituting member may be another member such as the door frame.

The first sidewall 41 is provided with the notches 41f each of which exposes the fixing portion 42f in the direction normal to the second inner surface 42c of the second sidewall 42. This structure makes it easy for the gun G to be inserted through the notch 41f and to be set on the second inner surface 42c. This makes it easier to fix the second sidewall 42 to the mirror bracket 23.

The notches 41f are provided closer to the second end portion 41b than the first locking portion 41e is. This structure prevents the first locking portion 41e from being chipped by the notches 41f, thereby making it possible for the first locking portion 41e to more reliably hold the glass run 45.

The distance between the third end portion 42a and the fourth end portion 42b of the second sidewall 42 is longer than the distance between the first end portion 41a and the second end portion 41b of the first sidewall 41. In the second sidewall 42 formed in this way, the fixing portions 42f configured to be fixed to the mirror bracket 23 are provided between the fourth end portion 42b and the second locking portion 42e. The lower sash 22 is fixed to the mirror bracket 23 on the tip side of the second sidewall 42 having the length longer than that of the first sidewall 41. This structure prevents the fixing portions 42f from being hidden by the first sidewall 41, thereby making it possible to fix the second sidewall 42 easier to the mirror bracket 23.

The mirror bracket 23 has the mirror attachment portion 51 and the inner reinforcement attachment portion 52. The mirror attachment portion 51 is configured to be fixed to the lower sash 22 and to allow the door mirror 4 to be attached thereto on the front side of the lower sash 22 in the front-rear direction. The inner reinforcement attachment portion 52 extends from the mirror attachment portion 51 and to which the inner reinforcement 25 is fixed on the rear side of the lower sash 22 in the front-rear direction. With this structure, it is not necessary to elongate the inner reinforcement 25 toward the front side beyond the lower sash 22, thereby making it possible to prevent an increase in size of the inner reinforcement 25. As a result, the door sash 11 can be reduced in weight.

The inner reinforcement attachment portion 52 is configured to be attached to the inner panel 16 on the rear side of the lower sash 22 in the front-rear direction. For example, a load which is generated by suction due to the sucked-out phenomenon, side collision, and door opening and closing and acts on the inner panel 16 becomes larger at the door central portion that is apart from the door front end and the door rear end where the front door 2 is fixed to the vehicle body. The position at which the inner reinforcement attachment portion 52 is attached to the inner panel 16 is located on the rear side of the lower sash 22, and thus close to the door central portion. With this structure, the stiffness of the front door 2 including the door sash 11 and the inner panel 16 increases at a portion near the door central portion, thereby preventing the inner panel 16 from being deformed.

The inner reinforcement 25 is located on the rear side of the lower sash 22 in the front-rear direction. The mirror attachment portion 51 is configured to be attached to the inner panel 16 on the front side of the lower sash 22 in the front-rear direction. This structure prevents the inner reinforcement 25 from covering the fixing portions 58a at which the mirror attachment portion 51 and the inner panel 16 are attached, thereby making it easy to fix the mirror attachment portion 51 and the inner panel 16 with the rivets 64 or by welding.

The inner reinforcement attachment portion 52 to which the inner reinforcement 25 is fixed is located at a more inner position of the vehicle 1 than the mirror attachment portion 51 fixed to the lower sash 22. With this structure, the inner reinforcement 25 can be disposed at a more inner position of the vehicle 1 than the lower sash 22 guiding the door glass 13, thereby preventing interference between the inner reinforcement 25 and the door glass 13.

The embodiment of the invention is exemplified as described above. The embodiment and modifications described above are provided by way of example only and not intended to limit the scope of the invention. The embodiment and the modifications can be implemented by other various forms, and can be omitted, replaced, or modified in various ways without departing from the scope of the invention. The structures and shapes of the respective embodiments and modifications can also be implemented by partially replacing them.

The invention claimed is:

1. A door sash structure, comprising:
a sash configured to guide a front end edge of a door glass of a vehicle while the door glass moves upward and downward, said door glass including an inner surface facing an inside of the vehicle and an outer surface opposite the inner surface;
a mirror attachment member for attaching a door mirror thereto, the mirror attachment member being directly fixed to the sash;
an outer reinforcement attachment member, which is a separate member from an outer reinforcement and having the outer reinforcement mounted thereto; and
a frame member, which is a separate member from the sash and is configured to guide the door glass together with the sash while the door glass moves upward and downward, the frame member being directly fixed to the sash, wherein
the outer reinforcement extends along the door glass,
the outer reinforcement lies adjacent to and on an outer side of the door glass relative to the vehicle,
the outer reinforcement attachment member is directly fixed to an outer surface of the mirror attachment member that faces in a same direction as the outer surface of the door glass,
the outer reinforcement attachment member is a separate member from the sash and is entirely located in front of the sash in a front-rear direction of the vehicle,
the outer reinforcement attachment member includes a first extending portion that extends in a direction intersecting a direction in which the sash extends, and
the mirror attachment member includes a second extending portion and a door mirror attachment portion, the second extending portion directly fixed to and extending from the frame member, and the door mirror attachment portion being surrounded by the sash, the first extending portion, and the second extending portion and configured to allow the door mirror to be attached thereto.

2. The door sash structure according to claim 1, wherein the outer reinforcement attachment member is spaced from the sash.

3. The door sash structure according to claim 1, wherein the sash includes a first sidewall, a second sidewall, and an end wall, the first sidewall extending along the outer surface of the door glass, the second sidewall extending along the inner surface of the door glass, and the end wall being connected to the first sidewall and the second sidewall and extending along the front end edge of the door glass, and
the mirror attachment member is directly fixed to the second sidewall.

4. The door sash structure according to claim 1, wherein the outer reinforcement attachment member includes an attachment portion, a first fixing portion, and a second fixing portion, the attachment portion being configured to allow the outer reinforcement to be attached thereto, the first fixing portion extending from the attachment portion and being directly fixed to the mirror attachment member, and the second fixing portion extending from the attachment portion and being directly fixed to the mirror attachment member,
the attachment portion has an outer surface facing in the same direction as the outer surface of the door glass, and
a virtual line connecting the first fixing portion and the second fixing portion intersects the attachment portion when the outer reinforcement attachment member is viewed in a direction normal to the outer surface of the attachment portion.

5. A door sash structure for a vehicle door, comprising:
a sash configured to guide a front end edge of a door glass of a vehicle while the door glass moves upward and downward, said door glass including an inner surface facing an inside of the vehicle and an outer surface opposite the inner surface;
a mirror attachment member for attaching a door mirror thereto, the mirror attachment member being directly fixed to the sash and disposed above a beltline of the vehicle door;
an outer reinforcement attachment member, which is a separate member from an outer reinforcement and having the outer reinforcement mounted thereto; and
a frame member, which is a separate member from the sash and is configured to guide the door glass together with the sash while the door glass moves upward and downward, the frame member being directly fixed to the sash, wherein
the outer reinforcement extends along the door glass,
the outer reinforcement lies adjacent to and on an outer side of the door glass relative to the vehicle,
the outer reinforcement attachment member is directly fixed to an outer surface of the mirror attachment member that faces in a same direction as the outer surface of the door glass,
the outer reinforcement attachment member is a separate member from the sash,
the outer reinforcement attachment member includes a first extending portion that extends in a direction intersecting a direction in which the sash extends, and
the mirror attachment member includes a second extending portion and a door mirror attachment portion, the second extending portion directly fixed to and extending from the frame member, and the door mirror attachment portion being surrounded by the sash, the first extending portion, and the second extending portion and configured to allow the door mirror to be attached thereto.

6. The door sash structure according to claim 5, wherein the outer reinforcement attachment member is spaced from the sash.

7. The door sash structure according to claim 5, wherein
the sash includes a first sidewall, a second sidewall, and an end wall, the first sidewall extending along the outer surface of the door glass, the second sidewall extending along the inner surface of the door glass, and the end wall being connected to the first sidewall and the second sidewall and extending along the front end edge of the door glass, and
the mirror attachment member is directly fixed to the second sidewall.

8. The door sash structure according to claim 5, wherein
the outer reinforcement attachment member includes an attachment portion, a first fixing portion, and a second fixing portion, the attachment portion being configured to allow the outer reinforcement to be attached thereto, the first fixing portion extending from the attachment portion and being directly fixed to the mirror attachment member, and the second fixing portion extending from the attachment portion and being directly fixed to the mirror attachment member,
the attachment portion has an outer surface facing in the same direction as the outer surface of the door glass, and
a virtual line connecting the first fixing portion and the second fixing portion intersects the attachment portion when the outer reinforcement attachment member is viewed in a direction normal to the outer surface of the attachment portion.

* * * * *